United States Patent
Wang et al.

(10) Patent No.: US 7,821,983 B2
(45) Date of Patent: Oct. 26, 2010

(54) EFFECTIVE DYNAMIC MANAGEMENT SCHEME OF HS-DSCH CHANNEL CODES

(75) Inventors: He Wang, Shanghai (CN); Xin Xu, Shanghai (CN); Xingjie Fan, Shanghai (CN); Luoning Gui, Shanghai (CN)

(73) Assignee: Alcatel, Paris (FR)

( * ) Notice: Subject to any disclaimer, the term of this patent is extended or adjusted under 35 U.S.C. 154(b) by 1663 days.

(21) Appl. No.: 11/002,145

(22) Filed: Dec. 3, 2004

(65) Prior Publication Data

US 2005/0171984 A1 Aug. 4, 2005

(30) Foreign Application Priority Data

Dec. 22, 2003 (CN) .......................... 2003 1 0122602

(51) Int. Cl.
*H04W 4/00* (2009.01)
(52) U.S. Cl. ...................................... 370/328; 370/465
(58) Field of Classification Search .................. 370/328, 370/465
See application file for complete search history.

(56) References Cited

U.S. PATENT DOCUMENTS

| | | | |
|---|---|---|---|
| 6,072,787 A | 6/2000 | Hamalainen | |
| 6,240,079 B1 | 5/2001 | Hamalainen | |
| 6,526,281 B1 | 2/2003 | Gorsuch | |
| 7,167,502 B1 * | 1/2007 | Tsaur ........................... | 375/130 |
| 2003/0002472 A1 * | 1/2003 | Choi et al. ................... | 370/347 |
| 2003/0081584 A1 * | 5/2003 | Heo ............................. | 370/342 |
| 2004/0192315 A1 * | 9/2004 | Li et al. ....................... | 455/447 |

FOREIGN PATENT DOCUMENTS

WO WO 03/096571 A1 11/2003

OTHER PUBLICATIONS

Lucent Technologies: TSGR1#19(01)0309: Semi-static Code Space Division of physical HS-DSCH 'Online! Feb. 26, 2001, XP002340295.

(Continued)

*Primary Examiner*—Kevin C Harper
(74) *Attorney, Agent, or Firm*—Sughrue Mion, PLLC

(57) ABSTRACT

The present invention discloses a comprehensive dynamic management scheme of HS-DSCH channel codes, which comprises the steps of: determining a remainder HS-DSCH channel resource of a system when a new HS-DSCH bearer service request is received; calculating a required HS-DSCH channel resource for the new service request; comparing the current system remainder HS-DSCH channel resource with the required HS-DSCH channel resource for the new service request; determining whether there is a need to add new HS-DSCH channel codes based on comparison results, assigning new codes or switching the service request into DCH channel for data transmission in accordance with the actual usage of the current code tree; when the existing HS-DSCH bearer service is completed, calculating a current system HS-DSCH channel resource usage ratio and hysteresis then comparing it with a predefined threshold, and determining whether there is a need to withdraw channel codes based on the results of comparison. The dynamic resource management scheme according to the present invention is well suited for application to future HSDPA technology as the technology is broadly spreading by radio resource management algorithms of radio network controller.

18 Claims, 3 Drawing Sheets

OTHER PUBLICATIONS

Nortel Networks: "TSGR1#17(00)1441: Downlink model for High Speed Downlink Packet Data Access" 'Online! Nov. 21, 2000, XP002340296.

G. Manueal et al, "Analysis of the transmission window for the delay performance of the high speed downlink packet access protocol" 2003 International Conference on Software Telecommunications and Computer Networks, online! Oct. 7, 2003, XP002340297.

* cited by examiner

EFFECTIVE DYNAMIC MANAGEMENT SCHEME OF HS-DSCH CHANNEL CODES

CROSS-REFERENCE TO RELATED APPLICATION(S)

This application is based on the Chinese Patent Application No. 200310122602.6 filed on Dec. 22, 2003, the disclosure of which is hereby incorporated by reference thereto in its entirety, and the priority of which is hereby claimed under 35 U.S.C. §119.

FIELD OF THE INVENTION

The present invention relates to a technology of High-Speed Downlink Packet Access (HSDPA) in the third-generation mobile communication system, and more particularly, to an effective dynamic management scheme of High-Speed Downlink-Shared Channel (HS-DSCH) channel codes.

BACKGROUND OF THE INVENTION

One major goal of the third-generation mobile communication system is to provide QoS (Quality of Service)-guaranteed multimedia services. In order to satisfy the requirement of the increased speed for the high-speed mobile data service especially for the mobile Internet service, an enhanced technique of UMTS, namely High Speed Downlink Packet Assess (HSDPA), is proposed in the recent 3GPP Release 5.

The primary purpose of implementing the HSDPA access scheme is to enable the WCDMA to support the transmission that may reach a peak rate of 8-10 Mbps in carrying out the downlink data packet services while achieving much lower transmission delay with a higher system capacity. Hence, the HSDPA process employs further enhanced technologies such as Adaptive Modulation and Coding (AMC), hybrid automatic repeat request (H-ARQ), fast cell selection (FCS) and multiple-input-multiple-output (MIMO) antenna processing. In the meantime, the HSDPA process is implemented with a new transmission channel, i.e., the High Speed Downlink Shared Channel (HS-DSCH). The HS-DSCH channel is designed with a smaller transmission timing-interval (TTI) that can be as small as 2 ms, thus enable the HSDPA process to achieve a faster dispatch of data packet, a smaller delay of HARQ and a faster channel adaptation of AMC. Furthermore, in order to reduce complication caused by UE and downlink signaling, the HS-DSCH channel adopts the Orthogonal Variable Spreading Factor (OVSF) codes. These codes have fixed spreading factor of 16. By using the time division multiplex (TDM) and code division multiplex (CDM) to share the system resource further improves the utilization ratio.

In general, a mobile communication system implemented with WCDMA uses the OVSF channel codes to achieve the dynamic allocation of the resource of system bandwidth and to provide variable data rates, thereby supporting various service bandwidth demands. FIG. 1 shows the tree structure for generation of the OVSF channel codes. Due to the limited numbers of codes available, the OVSF channel codes are considered as a scarce system resource in a system implemented with the WCDMA technologies. Furthermore, since the system utilization ratio is impacted by the orthogonal properties of the OVSF codes and the code assignment rule, how to reasonably use the OVSF code resource becomes an important design consideration for the Radio Resource Management (RRM) functions in a Radio Network Controller (RNC).

In a system implemented with the HSDPA access process, the OVSF channel codes employed for application to the HS-DSCH channel by definition have a fixed length of 16, e.g., C16,1 . . . C16,16 as that shown in FIG. 1. For a HS-DSHS channel the range of code selection is clearly defined. On the other hand, the protocol stipulates that a maximum of 15 OVSF channel codes with a length 16 can be used simultaneously for multi-code transmission of CDM in order to improve the instantaneous peak rate of the downlink shared channel. Since the OVSF codes are shared by various channels, the OVSF code resource with SF=4, 8, 16, . . . 512 is quite finite in the current WCDMA system. The R5 standard specification of 3GPP specifies maximum 15 SF 16 OVSF codes in HSDPA. Therefore, how to effectively use the finite OVSF code resource in the WCDMA system employing the HSDPA technology becomes a technical challenge. Since HSDPA service is carried on HS-DSCH channels and that specifies a maximum of 15 SF 16 OVSF codes, it is possible that the HSDPA service may not use so many OVSF code resources in a long period. In the meanwhile common DCH service lacks available OVSF resources in view of the HSDPA service burst and OFSF codes generation mechanism. By adopting a fixed allocation scheme for reserving HS-DSCH code, i.e., a certain number (less than or equal to 15) of OVSF codes are reserved for use in the HSDPA service, reduces the available DCH codes thus resulting in wastes of code resource without any beneficial effect of improving the system capacity.

Therefore, how to effectively manage and use these 15 HS-DSCH channel codes with a fixed length of 16 is an important design consideration for carrying out the HSDPA access in order to improve the system resource utilization ratio and system capacity. Due to the particular characteristics of the HS-DSCH channel codes, namely the fixed length of 16 and the maximum assignable 15 channel codes, the management of HS-DSCH channel code is entirely different from common management of other channel codes and must be handled with special cares.

Many existing researches on the management and assignment of the OVSF channel code resource merely take the assignment of common dedicated channel (DCH) codes into consideration. Such prior art disclosures include Chinese Patent Application No. 01105656.8 entitled "ALLOCATION METHOD OF SPREADING CODES IN WIDEBAND CMDA SYSTEM", a Chinese Patent Application No. 01112812.7 entitled "CODE ALLOCATION METHOD IN CDMA SYSTEM", Chinese Patent Application No. 01131225.4 entitled "ALLOCATION METHOD OF OVSF CODES", Chinese Patent Application No. 01131226.2 entitled "OPERATION AND MAINTENANCE METHOD OF OVSF CODES" and Chinese Patent Application No. 01138087.X entitled "DYNAMIC AND OPTIMAL ALLOCATION METHOD OF CHANNELIZATION CODE RESOURCE IN WIDEBAND CDMA SYSTEM".

All the code allocation methods disclosed in these patent applications consider only the process of the code allocation of the overall OVSF code tree by simply providing specific algorithms to manage the task of the code allocation. These prior art disclosures fail to take into account of the operation characteristics and mode of service supported by the HSDPA process and the code requirements of the HS-DSCH channels. In addition, in assigning the DCH codes, none of the existing code allocation algorithms considers the utilization ratio of the assigned code resource. Specifically, the assigned code resource is occupied till the service applying for a DCH is ended. At the end of the DCH service the assigned code resource is automatically withdrawn. However, after a cell is established, the HS-DSCH channel, different from DCH, is kept active continuously and shared by all users while assigning only those OVSF codes with a fixed length of 16 and using simultaneously of a maximum 15 codes. However, the operational schemes and methods of code allocation are restricted by the code tree assignment, while the strategy of adoption of the fixed reserving codes to reach the peak rate inevitably leads to waste of resource utilization.

In addition, some existing code allocation algorithms consider processing a service request class with respect to a data having a constant rate in most cases. However, services employing the HSDPA transmission, e.g., Internet browse, Internet games, download of e-mail annexes and download of audio and video media streams, have requirements of relatively small delay and bandwidth to handle burst transmission particularly for service of data transmission. The code allocation algorithms disclosed by the prior art do not provide appropriate measurement index for rates or bandwidth requirements in order to satisfy these operational requirements. An urgent need still exists to provide solutions in order to satisfy these requirements, particularly for services that demand a higher bandwidth rate.

SUMMARY OF THE INVENTION

It is an object of the present invention to provide a comprehensive dynamic management scheme of the HS-DSCH channel codes. After receiving a new request for HS-DSCH bearer service, the present scheme is capable of dynamically assigning the HS-DSCH channel codes based on the current bandwidth resource and in accordance with the basic QoS classes and traffic model of the requested service as well as the practical usage situation of the current OVSF code resource of the system. After the completion of the existing HS-DSCH bearer service, the present scheme is capable of dynamically withdrawing the HS-DSCH channel codes through calculating the utilization ratio of the HS-DSCH channel resource in the system.

It is another object of the present invention to provide a dynamic assignment scheme of the HS-DSCH channel codes depending on various QoS classes of service requests. The scheme enables the assignment and management of the HS-DSCH channel codes by taking into consideration of the the system capacity requirements and various service QoS demands, thereby providing services with effective Qos guarantee. Moreover, in order to improve the receiving and processing success ratio of the service request, the scheme also allows for switching the HSDPA transmission service to the DCH transmission under the circumstance where there are not enough SF 16 OVSF code resources, i.e., when some of the SF 16 OVSF codes are not utilized and still available however, a code congestion occurs due to the unavailability of some other SF 16 OVSF codes The flexibility of switching thus improve the overall system performance.

It is another object of the present invention to provide a dynamic withdrawal scheme of spare channel codes according to the HS-DSCH utilization ratio for effectively improving the HS-DSCH channel code usage ratio whereby increasing the OVSF code usage ratio and overall system capacity for providing user service.

The comprehensive dynamic management scheme of HS-DSCH channel codes as described in the present invention comprises the steps of:

after receiving a new request for a HS-DSCH bearer service:
First, calculating the current system utilization of the HS-DSCH channel resource, then subtracting the current system utilization of the HS-DSCH channel resource from the total system HS-DSCH channel resource for obtaining a remainder of the system HS-DSCH channel resource;

Next, calculating a required HS-DSCH channel resource for the new service request, based on the QoS requirements of the service request;

Comparing the current system remainder HS-DSCH channel resource with the required HS-DSCH channel resource for the new service request; if the remainder of the system HS-DSCH channel resource is greater than the required HS-DSCH channel resource for the new service request, then there is no need to add new HS-DSCH channel codes. The original HS-DSCH channel is employed to transmit the new service data. If the remainder of the system HS-DSCH channel resource is less than the required HS-DSCH channel resource for the new service request, then adding new HS-DSCH channel codes and assigning the newly additional codes or switching the service request into a DCH channel for data transmission, according to the practical situation of the current code tree usage;

at the completion of the existing HS-DSCH bearer service:
Calculating a current utilization ratio of the system HS-DSCH channel code resource and a hysteresis then comparing the utilization ratio with a predetermined threshold, if the utilization ration is greater than a predetermined threshold, then exit from an existing channel withdrawal process without withdrawing channel codes; if the utilization ratio is less than the predetermined threshold, then initiating a channel code withdrawal process.

The current HS-DSCH channel code usage ratio (CUR) is defined as the ratio of the sum of all downlink mean rates (DMR) or guarantee bit rates (GBR) of the current HS-DSCH bearer transmission service to the system HS-DSCH channel bandwidth.

The dynamic assignment process for assigning the HS-DSCH channel codes as described in the present invention comprises the steps of:

Comparing the GBR or DMR of a request service with a current available HS-DSCH channel bandwidth resource in accordance with the basic QOS classes of the request service;

If the request GBR or DMR is less than the available bandwidth resource, then no action is required to add new HS-DSCH channel codes, otherwise initiating a process for adding the HS-DSCH channel codes;

During the process of adding the HS-DSCH channel codes, if the current OVSF code tree does not have a required number of available HS-DSCH channel codes, then switching the request service into a DCH for new DCH code assignment; if there has the required number of HS-DSCH channel codes, then configuring additional HS-DSCH channel codes into a HS-DSCH channel through reconfiguration of the channel to support the request service demands.

The dynamic withdrawal scheme of the spare HS-DSCH channel codes as disclosed in the present invention comprises the steps of:

Comparing the number of current HS-DSCH channel codes with the number of channel codes corresponding to a predetermined minimum number of channel codes; exit the dynamic withdrawal process if the number of current HS-DSCH channel codes is equal to the number of channel codes corresponding to the predetermined minimum number of channel codes;

Calculating a current HS-DSCH capacity utilization ratio (CUR);

Comparing the current CUR with a predetermined CUR threshold;

Exit the present channel code withdrawal process if the CUR is greater than the predetermined threshold; otherwise, executing the code withdrawal process;

Continuously monitoring whether the system has received any new HSDPA service requests; if a new service request is received, then re-calculating the CUR, comparing the current CUR with the predetermined CUR threshold and reiterate the above process; if no new service is received, then calculating the number of channel codes that may be withdrawn.

Compared with the commonly practiced schemes for carrying out the task of DCH channel code assignment, the present invention discloses a method that does not impact the performance of the existing code assignment algorithms whereby the process disclosed in this invention can be conveniently integrated into the existing algorithms to compliment the existing channel code assignment algorithms. Besides, the present invention uses the original system channel code assignment algorithm for selecting the SF 16 OVSF codes to effectively manage the situations of code tree congestion, to resolve the problem arising from insufficient number of assignable HS-DSCH channel codes to provide a DCH channel to support a new request service. Aided by the HS-DSCH channel code management processes disclosed in the present invention, the existing code assignment algorithms are enabled to effectively support the demands of a new HSDPA service. The present invention provides HSDPA bearer services providing low delay requirements and burst transmission mode classes with a convenient, flexible and effective dynamic management scheme using the system bandwidth resource. The disclosed methods can be applied to the mobile communication systems implemented with the HSDPA technology as now increasingly adopted by the industry through the implementation of the Radio Resource Management (RRM) algorithm for the future Ratio Network Controller (RNC).

Other objects and features of the present invention will become more apparent by describing the embodiments by referring to the accompanying drawings as follows. In the accompanying drawings, a same alphanumeric designation denotes an identical or similar component.

BRIEF DESCRIPTION ON THE DRAWINGS

The accompanying drawings incorporated herein constitute as a part of the specification is provided to illustrate embodiments of the invention and, together with the description, serve to explain the principles of the invention.

DESCRIPTION OF THE PREFERRED EMBODIMENTS

Figure 1:
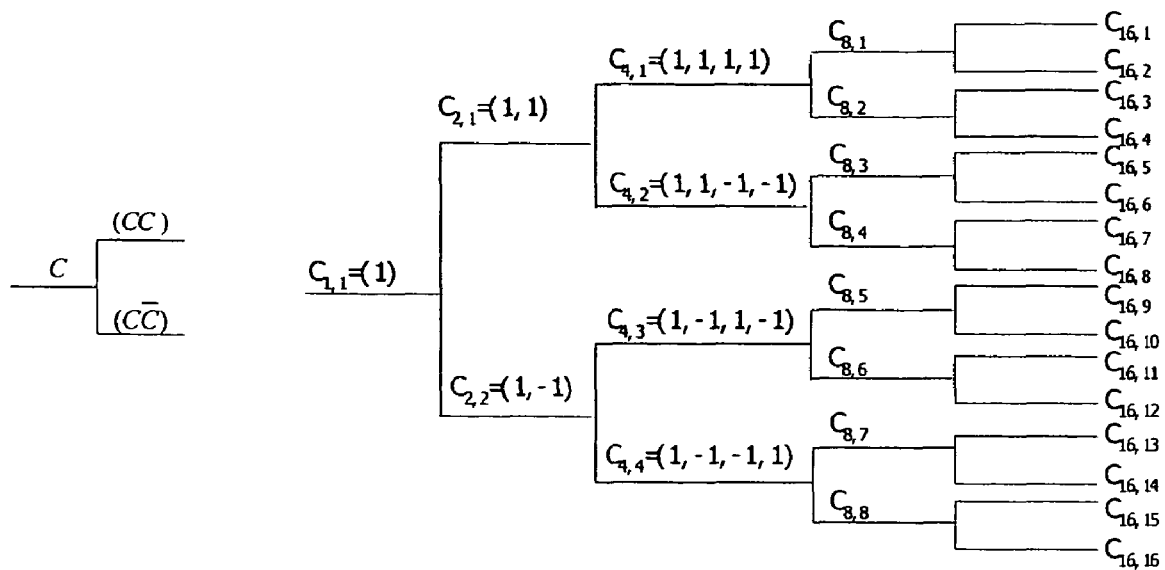
FIG. 1 is a diagram for showing the structure of the OVSF channel code generation tree.

The present invention will be described in detail with reference to the accompanying drawings for different preferred embodiments described below.

Based on the operational characteristic of the bearer service and the QoS requirements, the 3GPP protocol divides the existing services into four classes depending on the QoS service classes, namely Conversation Class, Interactive Class, Streaming Class and Background Class. Each of the service classes defines different requirements on QoS that provides a priority for adoption to the HSDPA transmission mode for signal transmission in accordance with the functional features of the HSDPA transmission mode and services of the streaming class and background class.

The present invention considers the facts that the services that adopt HSDPA for transmission are mostly streaming class and background class. A service request for these classes has a fixed total amount of data transmitted in a HS-DSCH channel. Considering these factors in conjunction with the service QoS request and some relevant parameters in traffic model, a service request of the streaming class uses the GBR in the QoS parameters for measuring the service request rate. On the other hand, a service request of the background class uses the DMR of the service request to measure the service request rate. The DMR of the service request is computed by using the Downlink Peak Rate (DPR) as part of the QoS parameters and the Downlink Activity Factor (DACT) in traffic model represented by an equation (DMR=DPR× DACT).

A service request of the streaming class sets a required GBR in the QoS parameters to define the required system transmission rates during a data transmission period in order to meet the QoS service requirement. Hence, for service of the streaming class, the GBR can be employed as standard for measuring the required transmission rates. As for a service request of the background class, the DMR is a convenient and equivalent representation of the delay requirement, burst mode service bandwidth and transmission rate. Hence, the DMR can by employed as a standard for measuring the requirement of a streaming class service on transmission rates.

In order to clearly describe the dynamic management scheme of the present invention, there is a need to hypothesize some prerequisites at first:

1. After a new service request has been admitted by the admission control (AD), it is confirmed that the system has the ability to accept and process the request. The confirmation is based on the available bandwidth and other system resources including the code resource. 2. Since the present invention focuses on the management of HS-DSCH channel code resource, priority is provided to the new requested service to adopt the HS-DSCH transmission mode in terms of selection of transmission channel.

3. Since the requested service may be a streaming class service request or a background class service request, the HS-DSCH channel resource required in the current system must satisfy the total requirements of all GBR and DMR of the transmitted streaming class and background class services.

Figure 2:
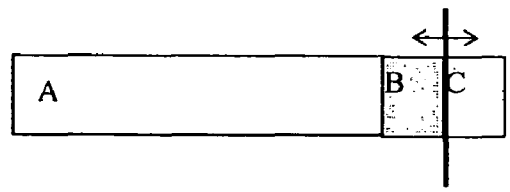
FIG. 2 is a schematic diagram for illustrating the dynamic management process of the HS-DSCH channel code as a preferred embodiment of the present invention.

FIG. 2 is a schematic drawing for illustrating the operational processes of the comprehensive dynamic management scheme of HS-DSCH channel codes as a preferred embodiment of the present invention, wherein:

A+B+C represents all OVSF codes ranging from SF 4 to SF 512;

B+C represents 15 SF 16 OVSF codes available to HS-DSCH;

B represents OVSF codes used by common DCH;

C represents the provision of only those OVSF codes used by HS-DSCH.

A vertical line shown with moveable double arrows represents the addition and reduction of the code assignments.

The key idea of the present invention is to dynamically move the vertical line between B and C based on a certain design criterion. When the black line is moved towards the right, it indicates an increase of code assignment and to the left a reduction and withdrawal of code assignment. As the vertical line is moved to the boundary line between A and B, it indicates that all the available HS-DSCH code resources are not enough to meet the bandwidth demands and part of HSDPA service will be set aside for switching to common DCH service.

According to the key idea of the present invention, the comprehensive dynamic management scheme of HS-DSCH channel codes as described in the present invention comprises:

When a new request of HS-DSCH bearer service is received, the following steps are taken in a preferred embodiment.

First, the current system occupied HS-DSCH channel resource is determined followed by calculating a remainder of HS-DSCH channel resource of the system by subtracting the current system occupied HS-DSCH channel resource from the system total HS-DSCH channel resource.

Then, the required HS-DSCH channel resource for the new service request is calculated.

Next, the current system remainder HS-DSCH channel resource is compared with the required HS-DSCH channel resource for the new service request. If the system remainder HS-DSCH channel resource is greater than the required HS-DSCH channel resource required for the new service request, there is no requirement to add new HS-DSCH channel codes. Data transmission of the new service is carried out on the original HS-DSCH channel. If the system remainder HS-DSCH channel resource is less than the required HS-DSCH channel resource for the new service request, then new HS-DSCH channel codes are added and the new codes are assigned. Or alternately, the service request is switched into a DCH channel for data transmission based on the actual usage status of the current code tree.

After completing the existing HS-DSCH bearer service, a process is further carried out to determine spare bandwidth in the HS-DSCH channel is available for subsequent evaluation of the system utilization rate.

In a preferred embodiment, the present invention further calculates the current HS-DSCH CUR, namely a system utilization ratio with regard to the HS-DSCH channel, and compares the HS-DSCH CUR with a predetermined threshold. If the HS-DSCH CUR is greater than the predetermined threshold, then it indicates a high HS-DSCH CUR in the current system. Withdrawal of channel codes is not necessary and a process of channel code withdrawal is not initiated. If the HS-DSCH CUR is less than the predetermined threshold, then a channel code withdraw process is initiated. By withdrawing under utilized code resources, the HS-DSCH channel utilization ratio is improved and the OVSF code utilization ratio of the whole system is also improved.

In the above processing steps, a current HS-DSCH CUR is defined as the ratio of the sum of all the DMR or GBR for the current HS-DSCH bearer transmission service to the system HS-DSCH channel bandwidth.

A dynamic HS-DSCH channel codes assignment scheme of the present invention will be is further described below.

A key operation of the dynamic HS-DSCH channel codes assignment scheme of the present invention is to compare the GBR or DMR of a request service with the current system resource of the available HS-DSCH channel bandwidth in based on the basic QoS classes of the request service.

Specifically, if the requested GBR or DMR is less than the available bandwidth resource, addition of new HS-DSCH channel codes is not required, otherwise new HS-DSCH channel codes must be added to the system to satisfy the service requirements.

During the process of adding the HS-DSCH channel codes, if the required number of HS-DSCH channel codes are not available in the current OVSF code tree while the system is able to support the bandwidth required by the service request as that confirmed by the admission confirmation (AC) system, then it is considered switching the requested service into a DCH for data transmission and assigning new DCH channel codes by using the existing code assignment schemes. If the required of HS-DSCH channel codes are available, then the additional HS-DSCH channel codes are configured into a HS-DSCH channel through reconfiguration to support the requested service demands.

Figure 3:
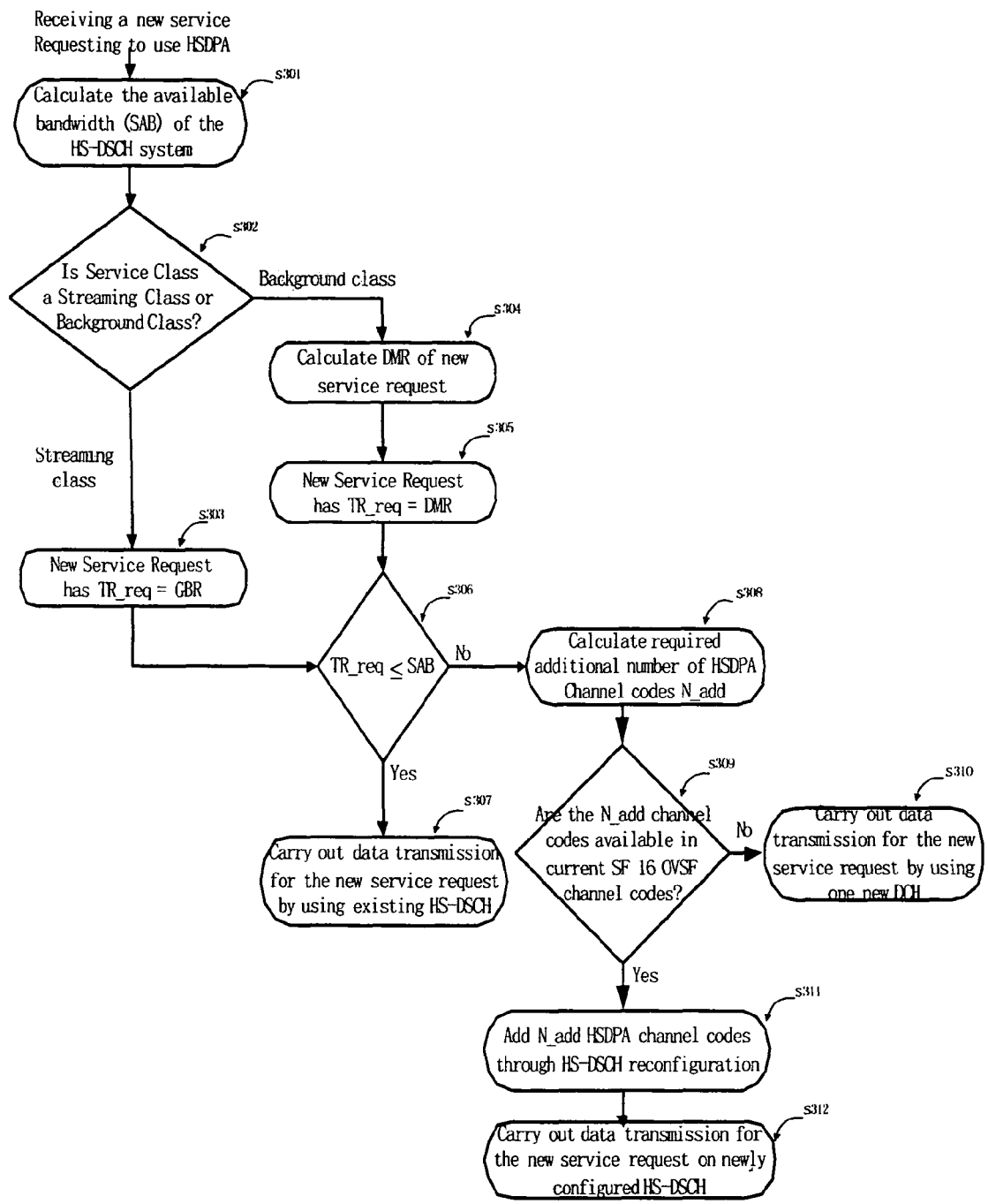
FIG. 3 is a flow chart for showing the process of the HS-DSCH channel code assignment in a preferred embodiment of the present invention.

Referring to FIG. 3 for the HS-DSCH channel code assignment strategy where a process is initiated after receiving a newly requested service that employs HS-DSCH for data transmission. The process proceeds with the following steps:

Step 301: Calculate the current system HS-DSCH available bandwidth (SAB) resource.

The value of SAB can be calculated by determining the total HS-DSCH bandwidth in the current system, which is calculated by subtracting the sum of all GBR and DMR of current system bearer HSDPA service from the total number of the HS-DSCH channel codes in the current system.

Step 302: Determining the QoS class of the current service request.

According to the service class specified by QoS parameters of the service request, it is determined whether the current service request is a Streaming class or a Background class in order to determine the parameters applied for measuring the required system bandwidth for the request.

Step 303: For a service request of the streaming class, the value of GBR received as one of the QoS parameters provides the request downlink transmission data rate (TR_req), i.e., TR_req=GBR.

Step 304: For s service request of the background class, the value of DMR is first calculated by the following steps.

The traffic model parameters DPR and DACT provided in the OoS request are employed to calculate the DMR of the service request according to the equation DMR=DPR× DACT.

Step 305: For a service request of the background class, the value of DMR represents the request downlink transmission data rate (TR_req), i.e, TR_req=DMR.

STEP 306: Compare TR_req with SAB to determine whether there is a need to add HS-DSCH channel codes.

If TR_req is less than the SAB, it indicates there is no need to add additional HS-DSCH channel codes and the process jumps to Step 307. The original HS-DSCH channel is employed to transfer the new request service data. If TR_req is larger than the SAB, it indicates there is a need to add HS-DSCH channel codes in order to improve the SAB and support the current request service demands. The process then jumps to Step 308 to calculate the number of HS-DSCH channel codes to add to the system in order to meet the service requirements.

Step 307: Transfer the new request service data using the existing HS-DSCH channel.

At this point of operation, there is no need to change the assignment of current HS-DSCH channel codes. Transmission of date for the new request is carried out by the existing HS-DSCH channel. Then the process ends as the present code assignment is now completed.

Step 308: Calculate the number of HS-DSCH channel codes that need to be added (N_add).

The N_add of SF 16 OVSF codes can be calculated by the difference between the TR_req and the SAB.

Step 309: Judge if there are N_add available SF 16 OVSF codes.

If the required N_add codes of the SF 16 OVSF codes are not available in the current OVSF code tree, it indicates that the current system cannot add N_add HS-DSCH channel codes now. Meanwhile, there are sufficient bandwidth resource to support the current request service. The process jumps to Step 310 using a new DCH to transfer the new request service data. Otherwise, it indicates that the system can add N_add HS-DSCH channel codes to transfer the new service request. The process jumps to step 311 to reconfigure the HS-DSCH channel.

Step 310: Use a new DCH to transfer the new request service data.

Since an admission confirmation (AC) process has been carried out to confirm, the system has the ability to support the new request service bandwidth requirements, hence when it is determined that the N_add HS-DSCH channel codes can not be added, a new DCH may be employed to transfer the new request service data. Such processing sequence satisfies the new service demands and further reduces the system failure rate The methods implemented for the original code assignment process may be employed for the DCH channel code assignment.

Step 311: Add N_add SF 16 OVSF codes through HS-DSCH reconfiguration.

In carrying out the HS-DSCH channel reconfiguration, N_add SF 16 OVSF channel codes are added so that the current HS-DSCH is enabled to simultaneously support the existing services and the new service request.

Step 312: Transfer the new request service data on the newly configured HS-DSCH channel in order to finish the present channel code assignment process.

The HS-DSCH channel code withdrawal scheme of the present invention considers primarily the current HS-DSCH channel code utilization ratio and the fixed 16-length character of HS-DSCH channel code. After completing a HS-DSCH bearer service, it is likely that there is some spare HS-DSCH bandwidth and for this reason, the system HS-DSCH channel code utilization ratio will definitely drop. In order to improve the channel code utilization ratio, it is advantageous to timely withdraw some HS-DSCH channel codes for use by other service requests. In order to satisfy the lowest rate, a double threshold with hysteresis determination mechanism is adopted in the withdrawal process of the present invention to improve the determination accuracy of the withdrawal strategy and to reduce unnecessary operation. The double thresholds include the lowest data rate threshold and channel utilization ratio threshold. These thresholds are predefined according to the system and service support planning.

Figure 4:
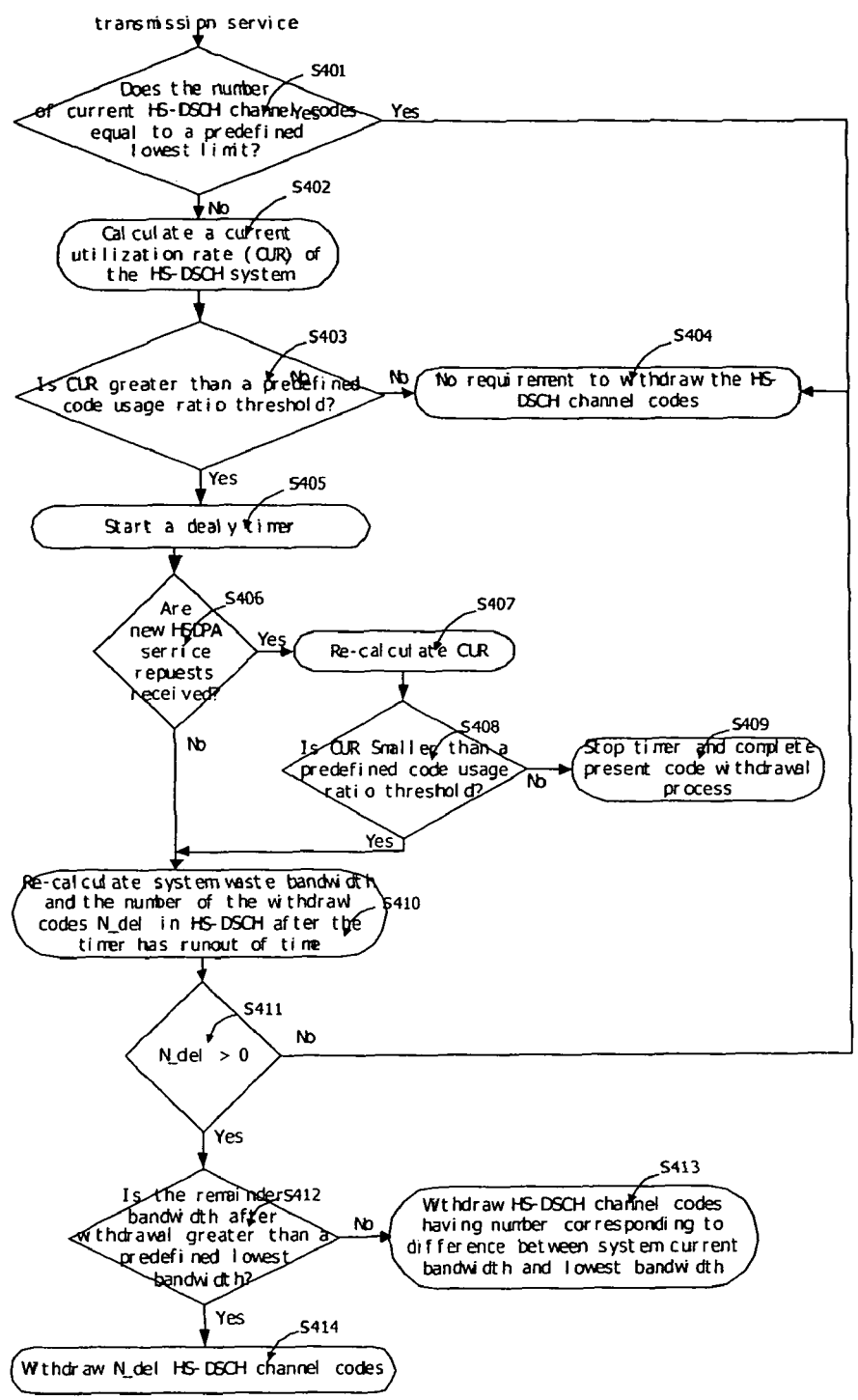
FIG. 4 is a flow chart for showing the process of the HS-DSCH channel code withdrawal in a preferred embodiment of the present invention.

FIG. 4 shows a the flow chart of the HS-DSCH channel code withdrawal scheme described in the present invention. The withdrawal processes are carried out after the completion of the HS-DSCH bearer data transmission service by performing the following steps:

Step 401: Compare the number of current HS-DSCH channel codes with the number of channel codes based on a predefined lowest limit data rate.

The number of assigned HS-DSCH channel codes is set above a predefined lowest limit to guarantee a lowest HS-DSCH bandwidth for the system. t If the number of current HS-DSCH channel codes equals to the lowest limit, then no codes shall be withdrawn and the process jumps to Step 404 to end and exit the present code withdrawal process. Otherwise, the process jumps to Step 402.

Step 402: Calculate the current channel utilization ratio (CUR) of the HS-DSCH transmission.

The CUR are calculated based on current system's HS-DSCH bandwidth and the sum of mean rates of HS-DSCH data transmission services. The CUR is defined as the ratio of the sum of all downlink mean rates (DMR) of the current HS-DSCH bearer transmission services to the system HS-DSCH bandwidth.

Step 403: Compare the current CUR with the predefined code usage ratio threshold.

If the CUR is great than the predetermined threshold, it indicates that the current system's HS-DSCH code usage ratio is higher than the predetermined threshold. There is no need to withdraw HS-DSCH codes to improve usage ratio, then the process jumps to step 404 to end and exit the present channel code withdrawal process. Otherwise, it indicates that the current CUR is lower than the expected CUR value. The process is to perform the code withdrawal process and jumps to step 405.

Step 404: Withdrawal of HS-DSCH codes not required.

It indicates that the current HS-DSCH CUR is still higher than the expected value and there is no channel code resource available for withdrawal.

Step 405: Start a hysteresis timer.

In order to improve the accuracy of determination whether to execute the withdrawal strategy and to avoid frequent code assignment withdrawal operations caused by CUR temporary fluctuations that may adversely impact the system efficiency, a time delay is implemented that allows the current CUR at a state lower than the threshold before a code withdrawal is initiated.

Step 406: Inspect whether new HSDPA service requests are received in the period when the timer is running.

If any new HSDPA service request is accepted in the period, the CUR of the system is changed that may cause the CUR to exceed the threshold. On the other hand, if a HSDPA transmission service is completed in the period calculation of a new CUR is not necessary because the CUR is further reduced upon the completion of a transmission service and that would not impact a current determination to execute a code withdrawal process. Step 407: Re-calculate the CUR if a new service request is received.

When receiving a new HSDPS service request, there is a need to re-calculate CUR in accordance with the actual situation.

Step 408: Re-compare the current CUR with the predefined code usage ratio threshold.

If the CUR is great than the predefined threshold, it indicates that the current usage ratio rises above the expected value and there is no need to withdraw code resource, and then the process jumps to step 409. Otherwise, the process proceeds and wait for the timer to run until it is out of time.

Step 409: Stop the timer and end and exit the present channel code withdrawal process.

Step 410: Re-calaulate the system waste bandwidth (SWB) and the number of withdrawal codes (N_del) in HS-DSCH after the timer has run out of time.

As the timer exceeds the preset time limit provides an indication that the current value of CUR is still below the latest value of a known CUR, therefore, the condition to perform code resource withdrawal still exists. Hence, the process continues with a calculation of the number of withdrawal.

Step 411: Compare N_del with 0.

Every time a HS-DSCH channel code is withdrawn, because the functional characteristics of the HS-DACH channel codes with fixed SF length 16, the current system HS-DSCH bandwidth is reduced by 16R (R is the basic data rate of SF=256). If the N_del obtained through calculation turns out to have a value of 0, it indicates that the waste bandwidth is not enough to release a code, and the process jumps to step 404 to end and exit the present process. Such a case may be avoided by setting a predefined threshold.

Step 412: Compared the remainder HS-DSCH bandwidth after withdrawal with the predefined lowest support bandwidth.

In order to guarantee the system to operate with a predefined lowest HS-DSCH bandwidth, before withdrawing any codes it is required to compare the remainder bandwidth after withdrawal with the predefined lowest bandwidth. If the remainder bandwidth after withdrawal is lower than the lowest bandwidth, then the process skips the code withdrawal step and jumps to step 413; otherwise the process proceeds to step 414.

Step 413: Withdraw the codes having a number corresponding to the difference between the system current HS-DSCH bandwidth and the lowest bandwidth.

The possibility exists that the process of directly withdrawing N_del codes may render the current system's HS-DSCH bandwidth less than the predefined lowest support bandwidth. Thus, in order to guarantee the lowest HS-DSCH bandwidth, the condition that the system bandwidth is lower than the predefined lowest bandwidth shall be prevented. For this reason, the maximum allowable number of HS-DSCH channel codes for withdrawal is determined by a value of the difference between the current HS-DSCH bandwidth and the lowest bandwidth.

Step 414: Withdraw N_del HS-DSCH channel codes and end and exit the present withdrawal process.

As the present invention has been described with reference to the preferred embodiments, many substitutes, modifications and variations are obvious to those skilled in the art according to the foregoing description. Therefore, the present invention will include all such substitutes, modifications and variations that fall under the concept and the scope of the appended claims.

What is claimed is:

1. A method for dynamically managing a set of High-Speed Downlink-Shared Channel (HS-DSCH) channel codes upon receiving a new HS-DSCH bearer service request comprising:
   determining a current system occupied HS-DSCH channel resource;
   subtracting the current system occupied HS-DSCH channel resource from a system total HS-DSCH channel resource for obtaining a system remainder HS-DSCH channel resource;
   determining a required HS-DSCH channel resource for the new HS-DSCH bearer service request;
   comparing the current system remainder HS-DSCH channel resource with the required HS-DSCH channel resource for the new HS-DSCH bearer service request; and
   if the system remainder HS-DSCH channel resource is less than the required HS-DSCH channel resource for the new HS-DSCH bearer service request, adding and assigning at least a new HS-DSCH channel code, according to a current code tree.

2. The method of claim 1 further comprising carrying out data transmission for the new HS-DSCH bearer service request using a Dedicated Channel (DCH) according to said current code tree.

3. The method of claim 1 wherein the receiving of said new HS-DSCH bearer service request comprises receiving a streaming class of HS-DSCH bearer service request or a background class of HS-DSCH bearer service request, wherein the required HS-DSCH channel resource for the streaming class is measured by a guarantee bit rate (GBR), and the required HS-DSCH channel resource for the background class is measured by a downlink mean rate (DMR).

4. The method of claim 1, further comprising determining a current system utilization ratio of HS-DSCH channel code resource, said determining comprising determining a ratio of a sum of all downlink mean rate (DMR) or guarantee bit rate (GBR) of a current HS-DSCH bearer transmission service to a system HS-DSCH channel bandwidth.

5. A method of dynamically managing a set of High-Speed Downlink-Shared Channel (HS-DSCH) channel codes upon receiving a service request, the method comprising:
   comparing a guarantee bit rate (GBR) or a downlink mean rate (DMR) of said service request with a current system available HS-DSCH channel bandwidth resource in accordance with a basic Quality of Service (QoS) class of the service request and adding a HS-DSCH channel code if said GBR or said DMR is greater than the current system available HS-DSCH channel bandwidth resource.

6. The method of claim 5 wherein:
   said adding said HS-DSCH channel code further comprises carrying out data transmission for the service request by assigning a new Dedicated Channel (DCH) code if a required number of available HS-DSCH channel codes exceeds an available number of channel codes in a current Orthogonal Variable Spreading Factor (OVSF) code tree.

7. The method of claim 5 wherein:
   said adding of said HS-DSCH channel code further comprises configuring the HS-DSCH channel code into a corresponding HS-DSCH channel through reconfiguration of the HS-DSCH channel if a required number of available HS-DSCH channel codes is less than an available number of channel codes in a current Orthogonal Variable Spreading Factor (OVSF) code tree.

8. The method of claim 7 wherein:
   the current system available HS-DSCH bandwidth (SAB) resource is determined through a current system total HS-DSCH bandwidth by subtracting a sum of all current GBR and DMR for a current High-Speed Downlink Packet Access (HSDPA) bearer service from a number of channel codes configured in current HS-DSCH channel of an entire system.

9. The method of claim 7 further comprising:
   determining whether the current service request is a streaming class or a background class according to a service class specified by a Quality of Service (QoS) parameter in the service request and employing the GBR in said QoS parameter as a request download transmission data rate (TR_req) by assigning said TR_req=GBR for a service request of the streaming class, and employing a DMR as the TR_req by assigning said TR_req=DMR for a service request of the background class.

10. The method of claim 9 further wherein:
said employing of the DMR of the service request further comprises calculating said DMR through a QoS request traffic model parameters downlink peak rate (DPR) multiplied by a downlink activity factor (DACT) as represented by an equation of DMR=DPR×DACT.

11. The method of claim 7 wherein:
said adding said HS-DSCH channel code further comprises determining a difference between the TR_req and the SAB for judging a required number of available HS-DSCH channel codes available in the current OVSF code tree for calculating a number (N_add) of said OVSF channel codes for adding said HS-DSCH channel code.

12. A method for dynamically managing a withdrawal of spare channel codes in a mobile communication system, said method comprising:
at a mobile communication system device, comparing and determining if a number of current High-Speed Downlink-Shared Channel (HS-DSCH) channel codes is greater than a predefined lowest number of channel codes;
withdrawing a spare channel code; and
continuing to execute said withdrawal of spare channel codes only if the number of current HS-DSCH channel codes is greater than a predefined lowest number of channel codes.

13. The method of claim 12 further comprising:
ending and exiting said withdrawal of spare channel codes if the number of current HS-DSCH channel codes is not greater than the predefined number of lowest channel codes.

14. The method of claim 12 further comprising:
if the number of current HS-DSCH channel codes is greater than the predefined lowest number of channel codes, calculating a current utilization ratio (CUR) of a current HS-DSCH channel code resource;
comparing the CUR with a predefined threshold of code usage ratio;
if the CUR is greater than the predefined threshold, ending and exiting the withdrawal of spare channel codes.

15. The method of claim 14 further comprising:
if the CUR is not greater than the predefined threshold, monitoring a new service request received over a preset period; and
if a new service request is received, recalculating a new CUR and comparing the new CUR with the predefined threshold for determining whether to proceed with said withdrawal of spare channel codes and a number of channel codes for withdrawal.

16. The method of claim 14 wherein said CUR is a ratio of the sum of all downlink mean rates (DMR) of current HS-DSCH bearer transmission services to system HS-DSCH channel bandwidth.

17. The method of claim 12 further comprising:
calculating a current utilization ration (CUR), and if the CUR is greater than a predefined code usage ratio, stopping a timer and ending and exiting the withdrawal of spare channel codes; and
if the CUR is less than the predefined code usage ratio, calculating a system waste bandwidth (SWB) and a number (N_del) of withdrawal codes in HS-DSCH after the timer runs out of a preset time limit.

18. The method of claim 12, further comprising:
calculating a number (N_del) of withdrawal codes in HS-DSCH, and determining whether the N_del is greater than 0;
if the N_del is not greater than 0, ending and exiting the withdrawal of spare channel codes;
if the N_del is greater than 0, comparing a remainder HS-DSCH bandwidth after withdrawal with a predefined lowest support bandwidth;
if said remainder HS-DSCH bandwidth is less than the lowest support bandwidth, withdrawing only HS-DSCH channel codes having a number of withdrawn codes equal to the difference between the current HS-DSCH bandwidth and the lowest support bandwidth; and
if the remainder HS-DSCH bandwidth is not less than the lowest support bandwidth, then withdrawing the N_del HS-DSCH channel codes and ending and exiting the withdrawal of spare channel codes.

\* \* \* \* \*